United States Patent Office 3,546,504
Patented Dec. 8, 1970

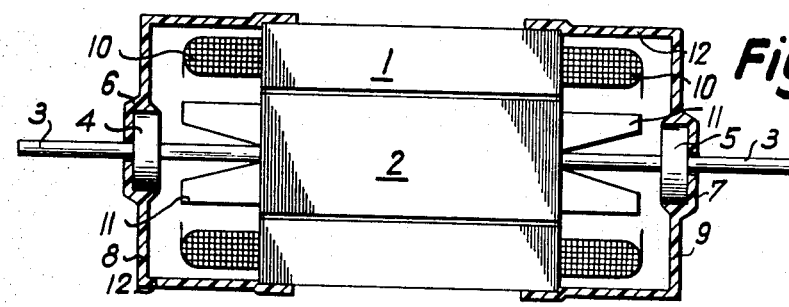
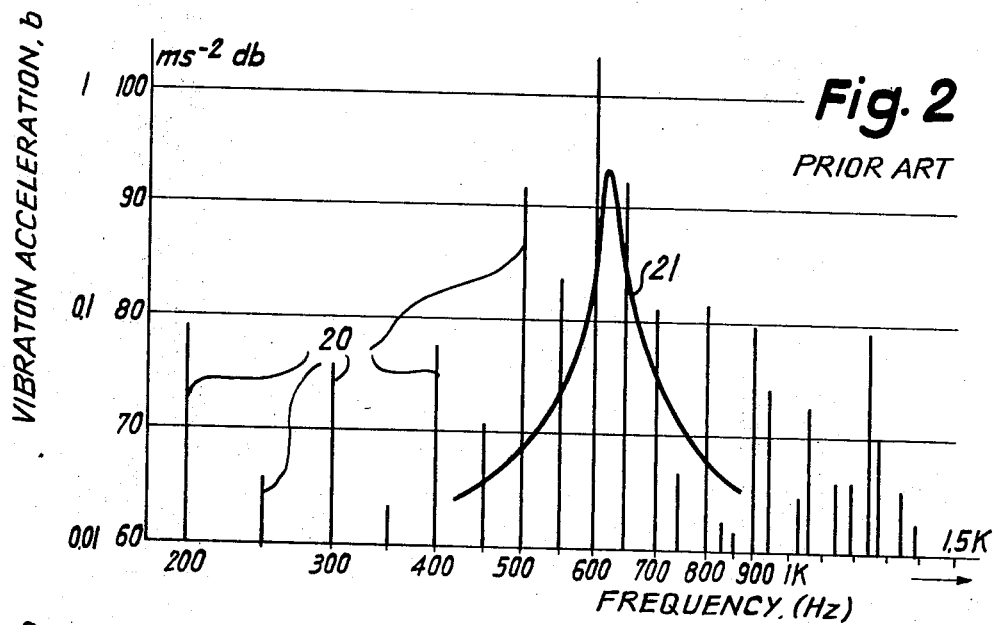
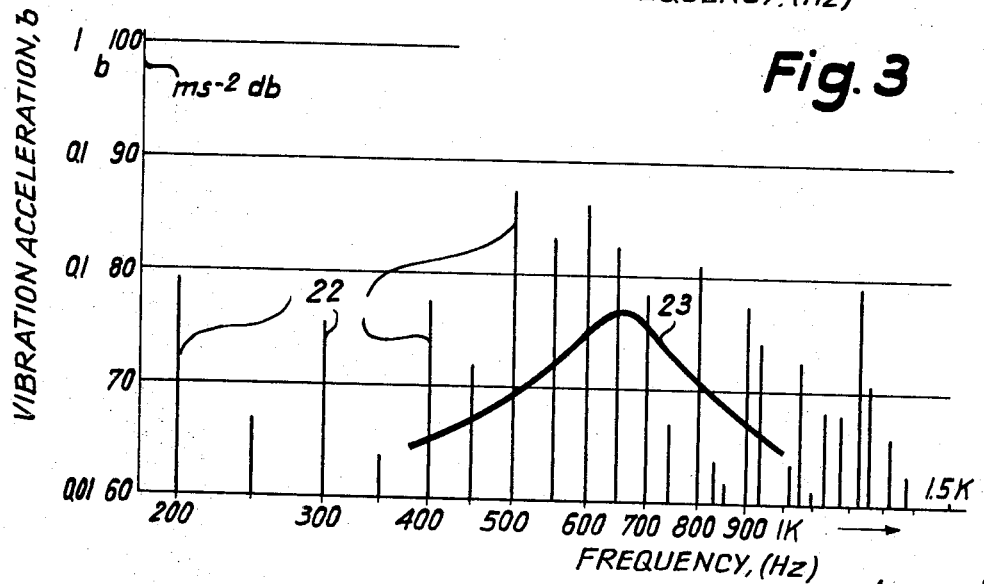

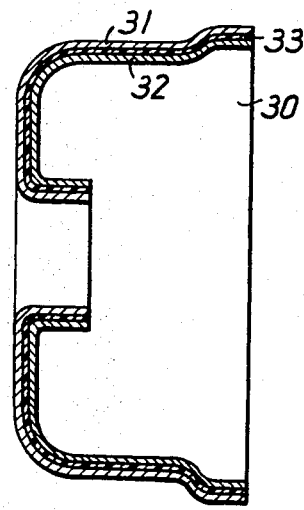
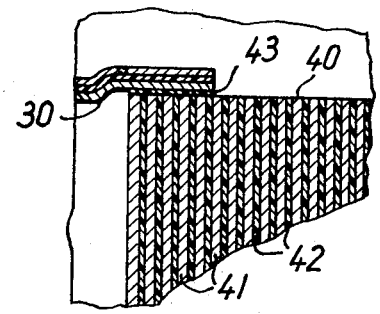
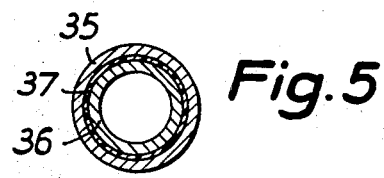
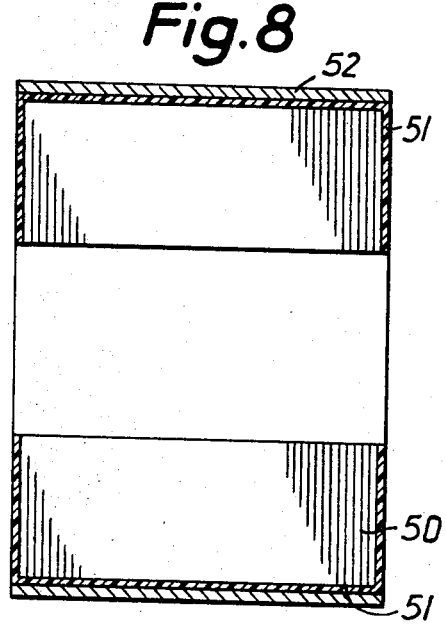
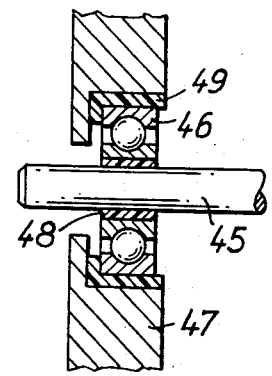

3,546,504
NOISE REDUCING ARRANGEMENT FOR ELECTRIC MOTORS
Hans-Joachim Janssen, Hundsmuhlen, and Peter Böttle, Oldenburg, Germany, assignors to Licentia Patent-Verwaltungs-G.m.b.H., Frankfurt am Main, Germany
Filed Nov. 4, 1968, Ser. No. 773,134
Claims priority, application Germany, Nov. 2, 1967, 1,613,283
Int. Cl. H02k 5/02, 5/24
U.S. Cl. 310—51                          10 Claims

ABSTRACT OF THE DISCLOSURE

The resonant vibrations of an elongated miniature electric motor of the type not having a separate housing are substantially eliminated by forming all of the supporting and connecting members of the motor utilized to mount the rotor and stator thereof in their operative relationships, other than those components which for operational reasons can only be formed of a material having a low inherent damping characteristic, of a low-resonant material having an extremely high damping characteristic. In order to damp the vibrations from those components which can not be formed of a material having a high inherent damping characteristic, a layer of vibration damping material is placed between such components and the adjacent portions of the motor.

BACKGROUND OF THE INVENTION

The present invention relates to an arrangement for reducing the noises created during operation of a small electromotor of a type constructed without a housing.

When operating electromotors, vibrations are generated which have different origins. These are, on the one hand, vibrations generated by electromagnetic forces and, on the other hand, vibrations generated by mechanical means. In miniature motors, the first-mentioned type of vibrations are usually harmonic vibrations which have a frequency twice that of the frequency of the mains, vibrations produced by the fundamental slot frequency and, finally, vibrations produced as a consequence of the harmonics and the sidebands of these vibrations. Mechanically generated vibrations are those, which result from the operation of the motor. Such vibrations are caused by the ball bearings as well as by the imbalance and the eccentricities of the rotor due to inaccuracies unavoidably built into the rotor during its manufacture.

All of the above-mentioned vibrations are within the audible frequency range of approximately 16 Hz. to 16 kHz. and often produce resonant vibrations in individual components of the motor or in the device in which the motor is installed. These vibrations result in creating unduly loud noises.

It is a requirement of modern drive arrangements, particularly those employed in sound-reproducing devices, office machines and oil burners, that they be designed with the end in mind of reducing mass vibrations and noises to such an extent that, when operated, interfering noises will not noticeably emanate from such instruments. In the course of the past years, the industry has been able to almost eliminate direct transmission of mass noises to the instrument or to its housing, respectively. The industry has also succeeded in reducing the bearing noises and substantially inhibiting transmission of such noises to surrounding components, particularly to the rotor shaft and the bearing flanges, by providing suitable damping and/or insulating means.

However, the problem of the resonance of individual components of the motor, due to electromagnetically or mechanically produced vibrations, and the generation of noise connected therewith has not yet been solved. The main reason for this is the unconventional construction of present day motors.

For example, one miniature motor of present day construction is intended to drive sound-reproducing instruments. This motor is not provided with a housing in the conventional sense. It is provided with a plurality of individual, more or less, permanently mounted structural components which are constructed in order to provide the best possible utilization of material for the sake of economy. These individual components vibrate either alone or in vibratory systems formed in conjunction with other components. The natural (i.e., fundamental) frequency of each individual component or systems of components is spread over a wide frequency range of from about 0.3 to about 3 kHz. The significance of this, particularly with regard to human hearing, is that noises at these frequencies are especially annoying. The relatively wide spread of the frequency range increases the probability that any electromagnetically or mechanically produced random vibration of the motor will cause resonant vibrations in any component thereof. Such resonant vibrations characteristically result in unduly loud noises.

It is known how to tune a miniature motor over- or under-critically in order to inhibit resonant vibrations. This approach, however, is no longer suitable for miniature motors manufactured according to present day techniques of fabrication since, as this is shown in FIG. 2, the noise distribution of such motors is very widely spread out. A greater frequency range without any inherent motor vibrations and within which a fundamental slot frequency could be placed is no longer available for appropriately designed electric motors.

It is further known to manufacture individual components, particularly the bearing flanges and plates, of a material exhibiting high inherent damping properties. Measures of this type, however, are limited to individual components of the motor so that it has thus far only been possible to isolate individual vibrations which emanate from certain motor components and which create noises.

It is also known, in order to simplify the assembly of motors without housings, how to fasten individual components by the intermediary of an adhesive or specially formed connecting synthetic resin compensation layer. Here, too, it has only been possible to isolate individual noise sources.

It is also known how to embed the entire motor in casting resin. By this approach, the supporting elements, for example the bearing flanges or bearing plates, respectively, are formed of the casting material in the same operational process. Motors produced according to this method, however, do not meet the requirements of construction necessary for motors of the type to which the present invention relates since the casting resin layer which was applied mainly as a protection against humidity exhibits a relatively low strength, (i.e., supporting components made of this material must have undesirably large dimensions if their strength is to meet the stated requirements). A motor, thus constructed, does not fulfill the requirements of increased compactness with increased power output. Moreover, such motors would have to be cooled very intensively, since their iron and copper contents would be highly utilized, and, since the surrounding casting resin layer is of poor heat-conducting quality, the necessary ventilation output and the ventilation noises to be expected make the use of such motors for the above-mentioned purposes appear very impractical. With respect to providing insulation against the operating noise of such a motor, there is the disadvantage that the same casting material, depending on the motor component on which it is disposed, would have to exhibit optimum noise-insulating as well as optimum noise-damping characteristics; such a material, however, is unknown. Thus, it is virtually impossible to eliminate the noise in such motors by specially designed individual components due to the different operating conditions and operational requirements of each component. Hence, a considerable portion of the operating noise of such motors is transferred to the housing.

In contrast to the above-described approaches to suppressing noise in small electric motors, the inventors have discovered that the most effective approach toward eliminating noise in such motors can be achieved only when the motor as a whole is considered to be a vibratory structure or system and is treated accordingly. According to the invention a reduction of noise for the entire motor is achieved by treating the individual components of the motor by direct application of special measures so that the noise is reduced thereat.

SUMMARY OF THE INVENTION

It is therefore the object of the present invention to provide an optimum reduction of the operating noises even in miniature motors without housings whose noise spectrum is distributed almost uniformly over the frequency range of from about 0.3 to about 3 kHz.

According to the present invention, all structural components of the motor which perform only a supporting or connecting function and which either are self-vibrating or can be actuated to vibrate along with the vibrations generated during operation of the motor or which can be caused to perform resonant vibrations, are constructed of a low-resonant material with extremely high inherent damping.

BRIEF DESCRIPTION OF THE FIGURES

FIG. 1 shows a schematic view of a miniature motor without a housing.

FIG. 2 shows a graphic illustration of the course of the motor resonance curve of the first order for a miniature motor of conventional construction.

FIG. 3 shows a graphic illustration of the course of the motor resonance curve of the first order of a miniature motor insulated against vibrations according to the present invention.

FIG. 4 shows a cross sectional view of a connecting member.

FIG. 5 shows a cross sectional view of a rotor shaft.

FIG. 6 shows a part of a stator lamination packet.

FIG. 7 shows the mounting of the rotor shaft in the bearing flange.

FIG. 8 shows a cross sectional view of a stator lamination packet and its surrounding layers.

DESCRIPTION OF THE PREFERRED EMBODIMENTS

FIG. 1 is a schematic illustration of a miniature motor without a housing according to a known modern construction. The rotor 2 which is fastened to the shaft 3 rotates in the stator lamination packet 1. The shaft 3 runs in bearings 4 and 5 which are held by bearing flanges 6 and 7. The bearing flanges 6 and 7 are either a part of the bearing plates 8 and 9 or they are fastened to the bearing plates 8 and 9. In the flat construction of such motors the winding heads 10 extend considerably. Because of the high utilization of material, a sufficient ventilation is absolutely necessary which is accomplished by the relatively large ventilating wings 11. The most striking consequence of the required flat, stretched-out construction is to be seen in the fact that arms 12 must be disposed between the bearing plates 8 and 9 and the stator lamination packet 1. The arms 12 can be either a portion of the bearing plates 8 and 9 or a portion of profile rods, bolts, and similar components of the motor. The supporting or connecting components of such a motor, for example, the bearing flanges 6, 7, arms 12, mounting brackets, rotor shaft 3, rivets in the lamination packet, etc., are constructed with a view toward the utmost utilization of material. Thus, such components, to a great extent, have flat, extended shapes and the motors are provided several structural components which fall into forced or resonant vibrations, respectively, with reference to the fundamental slot wave, its sidebands or other operationally caused vibrations when the motor is being operated. This is due to the wide noise possibility spectrum.

In FIG. 2, the noise values measured in a miniature motor constructed according to prior art manufacturing techniques, (i.e., without additional means for damping or insulating vibrations) are shown in a graphical illustration. As can be seen, the vibration acceleration $b$ is chartered as a function of the frequency $f$.

The vertical lines 20 of FIG. 2 indicate the noise values of the individual partial sounds of the motor which occur during its operation. It can be seen in the diagram that the noise values are widely spread and cover the contemplated range 0 to 1.5 kHz., with peak values of over 100 db. If this motor is externally excited by a frequency-controllable vibrator, the motor resonance curve 21 results. This curve can be displaced—theoretically— by changes in configuration of individual components of the motor. This, however, would be very difficult in this particular motor due to its extremely broad noise spectrum, since resonant vibrations can result at any point of the frequency band, (i.e., over- or undercritical tuning alone no longer leads to the desired result).

Because of the above-described difficulties, in order to reduce the operating noise of the motor, other means must be employed. In this respect it has proven to be very effective, on the one hand, to provide direct damping for all those motor components which, due to their construction, tend to vibrate and, on the other hand, to insulate the vibrations of those components which can not be damped due to their particular construction or function in the motor.

The term "damping of the vibrations" as used herein is intended to mean the conversion of vibratory energy into heat. According to the present invention, "damping of the vibrations" is to be accomplished by making the structural elements of the motor, which are to be damped, out of a low-resonant material, if possible, having a high logarithmic decrement or high inherent damping characteristic, respectively. It is to be understood that as used herein, the term "low-resonant material" is intended to mean a material whose resonant frequency is so low that it can not readily be heard by the human ear. Particularly well suited for accomplishing this desired purpose are those synthetics which, exhibit high inherent damping and which possibly, can also be characterized by resilience or form-elasticity.

Such a synthetic is, e.g., a polymer which consists of vinylidenefluoride and hexafluoropropylene.

Additional, so-called double-layer or sandwich materials can be used. Such materials are characterized by having, for example, two pieces of sheet metal with a layer of material having a high inherent damping property disposed therebetween.

It is particularly advantageous to manufacture the rotor shaft, which is very susceptible to vibrations due to its length and its structurally reduced diameter, of such material. This can be accomplished, for example, in that thin-walled tubes are pushed onto the shaft at both ends of the rotor and that the space between the shaft and the tube is filled with a damping material.

FIG. 4 shows a cross sectional view of a connecting member, e.g., a bearing support 30 in sandwich-type-form. Between the sheet metal 31 and the sheet metal 32 a layer 33 of a synthetic material is disposed.

FIG. 5 shows a cross sectional view of a rotor shaft. Between the tube-like portions 35 and 36 is disposed a layer 37 of a synthetic material to damp the vibrations of this shaft. The tube-like portions 35 and 36 are in telescoping arrangement with respect to one another and the intermediate layer 37 has high inherent damping properties.

It is, however, also possible to construct the shaft in its entire length as a tube filled with a damping material. The same applies also for the bolts or rivets, which penetrate the stator lamination packet and which possibly extend therefrom, as well as for the arms 12 adjacent to the bearing plates. The bearing plates 4 and 5, themselves, are advisably fabricated of sandwich material.

Other motor components which should be damped include screw bolts for fastening the bearing flanges to the motor, mounting clamps or bolts to hold the motor to the device, belt pulleys or gears, etc. Finally, there is also the possibility of damping a conventional, resonant material, for example, cast aluminum, by completely immersing it in a damping mass which is also known, for example, by the name of "antinoise compound."

Such a "antinoise compound" is, e.g., a compound of bitumen or caoutchouc, but also a foamed polystyrol or a high-polymeric substance.

The term "insulation," as used herein, is intended to mean the insertion of a spring-elastic layer between two components, one of which is susceptible to the vibrations against the transmission of which the other component is to be protected. Thus, the vibratory system consisting of these two components is detuned. One requirement for optimum insulation against vibrations in such a system is that the natural frequencies of the vibrating portions must be different from one another by at least 1/3 and that the insulating layer inserted between the vibrating portions must have a low logarithmic decrement or low inherent damping property, respectively.

The present invention contemplates an insulating layer, or component, which is arranged at the stator and rotor lamination packets. Such insulating layer, component or element is provided not only between such packets and the adjacent structural elements, particularly the rotor shaft and the arms 12, but also with respect to the bolts, rivets or the like which are brought through the lamination packet.

This prevents the transmission of the vibrations from the lamination packets, which vibrations are produced mainly by the rotor eccentricity and the fundamental slot frequency. The insulating layer can consist, for example, of a spring-elastic or rubber-elastic material, having little inherent damping.

FIG. 6 shows a part of a stator lamination packet 40, which is drawn in a cross sectional view. The arm or supporting member 30 is arranged on the stator lamination packet 40 and connects it to the bearing flange (e.g., 6 of FIG. 1). Between the individual laminations 41 is disposed a synthetic material 42 which has high inherent damping properties.

Also a synthetic material 43 is arranged between the circumference of the stator lamination packet and the arm 30. The synthetic material 43 has also high inherent damping properties. The rotor lamination packet may be similarly constructed or arranged.

FIG. 7 shows the arrangement between the motor shaft 45, the ball bearing 46 and the bearing flange 47. The ball bearing 46 is disposed on the shaft 45. Between the shaft 45 and the ball bearing 46 is arranged a thin elastic web 48 for damping the noise of the ball bearing. Between the bearing flange 47 and the ball bearing 46 the intermediate layer 49 is arranged, also for damping the noise of the ball bearing. The web 48 and the layer 49 have high inherent damping properties and prevent the noise of the ball bearing 46 from passing to the adjacent components.

One possibility for the further reduction of the mass noises of such a motor is provided by the fact that the noise produced by vibrations particularly of the stator lamination packet and propagated through air is prevented from being radiated. This is preferably accomplished by application to the lamination packet of a damping layer of a material possessing high inherent damping similar to the "antinoise compound" used with sheet metals. Since this layer must remain elastic, it is recommended to place a further thin sheet metal coating around the stator lamination packet to protect the damping layer.

FIG. 8 shows a cross sectional view of a stator lamination packet 50. The stator lamination packet 50 is surrounded by a layer 51 of material having high inherent damping properties. Sheet metal 52 is disposed on the layer 51 in surrounding relationship to the stator lamination packet 50.

In case the above-discussed insulating means cannot be employed in individual cases for reasons of construction, vibrations originating from the stator and rotor lamination packets can also be damped to a certain degree in that the rivets, bolts or the like brought through the packet are either made hollow and filled with a vibration damping material or a layer of vibration damping material is disposed between these components and the lamination packet.

FIG. 3 is a graphical illustration corresponding to FIG. 2 in which the noise values are graphically illustrated. The noise values of FIG. 2 have been achieved in a motor of identical construction to that on which the FIG. 2 graphical illustration is based, only, after the teachings of the present invention have been incorporated therein. It can be seen that the individual noise values 22 lie considerably below the noise values 20 of FIG. 2 and a noise reduction of the individual partial sounds by approximately 20 db. results. Consequently, the resonance curve 23 is flatter.

The present invention has the advantage that a consistently applied vibration-damping or insulation of all self-vibrating components, which are susceptible to resonant vibrations or which emit soundwaves, in an electric miniature motor will result in a considerable suppression of the running noises of such motor. Thus, motors constructed according to the teachings of the present invention will operate in a substantially noiseless manner and are suitable, for example, for use in sound-reproducing devices, office machines and also for use in the blowers of oil burners. On the other hand, the external dimensions and the power output of such a motor also meet existing requirements so that a motor of such construction represents a very advantageous development in the field of miniature motors.

It will be understood that the above-description of the present invention is susceptible to various modifications, changes, and adaptations.

We claim:

1. In an elongated electric motor of the type which does not have a separate housing including a stator having a lamination packet and elongated winding head zones; a rotor shaft disposed in said stator; a rotor having a lamination packet mounted on said rotor shaft; supporting members at each end of said rotor shaft for supporting said rotor shaft; and connecting members in the form of elongated arms connecting said supporting members to the stator lamination packet, some of said supporting and connecting members being subject to self-vibrations, some to resonant vibrations and others to vibrations caused by the operating motor; and wherein the motor in operation has a noise spectrum substantially uniformly distributed over the entire frequency band of from about 0.3 to about 3 kHz., the improvement wherein all of the individual supporting and connecting members subject to said various vibrations other than those members which, for mechanical or electrical reasons, can only be constructed of a material having low inherent damping properties, are formed of a low-resonant material having very high damping properties, thereby to substantially eliminate the resonant vibrations of such members.

2. Electric motor as defined in claim 1 wherein said members which can only be constructed of material hav- 3. Electric motor as defined in claim 1 wherein said low-resonant material from which said supporting and connecting members subject to resonant vibrations are constructed is a sandwich-type material.

4. Electric motor as defined in claim 1 wherein said low-resistant material from which supporting and connecting members subject to resonant vibrations are formed in a synthetic material.

5. Electric motor as defined in claim 1 wherein said rotor shaft is formed of a plurality of tube-like portions which are in telescoping arrangement with respect to one another and an intermediate layer of elastic material having high inherent damping properties is inserted between said portions.

6. Electric motor as defined in claim 1 wherein an intermediate layer of elastic material is inserted between the laminations of said stator packet, between the laminations of said rotor packet, and between said rotor and stator lamination packets and the adjacent connected components.

7. Electric motor as defined in claim 1 wherein said supporting members at each end of said rotor shaft include a bearing flange and a bearing provided in said bearing flange; and each end of said rotor shaft is mounted in the associated bearing and elastic material having low inherent damping properties is inserted between said bearing and bearing flange and between said rotor shaft end and bearing at each end of said rotor shaft.

8. Electric motor as defined in claim 1 wherein said stator lamination packet is surrounded by a layer of material having high inherent damping properties.

9. Electric motor as defined in claim 8 wherein sheet metal is disposed on said layer of material in surrounding relationship to said stator lamination packet.

10. In an electric motor of the type without a separate housing including a stator having a lamination packet and widely distributed winding head areas; a rotor shaft disposed in said stator; a rotor having a lamination packet mounted on said rotor shaft; supporting members at each end of said rotor shaft for supporting rotor shaft and connecting members in the form of elongated arms connecting said supporting members to the stator lamination packet, some of said supporting and connecting members being subject to self-vibrations, some to resonant vibrations and others to vibrations caused by the operating motor; and wherein the motor in operation has a noise spectrum substantially uniformly distributed over the entire frequency band of 0.3 to 3 kHz., the improvement wherein the individual supporting and connecting members subject to self-vibrations and the individual supporting and connecting members subject to resonant vibrations are all formed of resonant material surrounded by a layer of strong vibration-damping material.

References Cited

UNITED STATES PATENTS

| | | | |
|---|---|---|---|
| 1,688,891 | 10/1928 | Spreen | 310—51 |
| 2,220,751 | 11/1940 | Bergman | 310—51X |
| 2,293,951 | 8/1942 | Seastone et al. | 336—234X |
| 2,874,008 | 2/1959 | Orte et al. | 310—51X |
| 2,894,156 | 7/1959 | Kent | 310—154 |
| 3,234,417 | 2/1966 | Somers et al. | 310—154 |
| 3,378,709 | 4/1968 | Royer et al. | 310—90 |
| 3,447,010 | 5/1969 | Vreeland | 310—217 |

WARREN E. RAY, Primary Examiner

U.S. Cl. X.R.

310—43, 85, 217